United States Patent

[11] 3,523,567

| [72] | Inventor | Ralph R. Voigts<br>Rte. 1, Cornell, Illinois 61319 |
|---|---|---|
| [21] | Appl. No. | 629,319 |
| [22] | Filed | April 7, 1967 |
| [45] | Patented | Aug. 11, 1970 |

[54] TIRE BEAD BREAKER
5 Claims, 4 Drawing Figs.

| [52] | U.S. Cl. | 157/1.17 |
|---|---|---|
| [51] | Int. Cl. | B60c 25/06 |
| [50] | Field of Search | 157/1.17, 1.21, 1.26 |

[56] References Cited
UNITED STATES PATENTS

| 3,033,268 | 5/1962 | Schaevitz | 157/1.26 |
|---|---|---|---|
| 3,362,453 | 1/1968 | Nester | 157/1.17 |

*Primary Examiner*— Granville Y. Custer, Jr.
*Attorney*—Low and Matthews

ABSTRACT: Inexpensive and efficient means for removing a truck or industrial tire from its wheel rim, particularly from such rims having a removable locking rim wherein the spade of the tire bead breaking means is mounted for vertical adjustment and substantially horizontal reciprocation, so that it may be aligned with the side of a vertically positioned tire close to the tire rim, and the spade advanced to engage the tire and separate at least a portion of the tire bead from its rim.

Patented Aug. 11, 1970
3,523,567
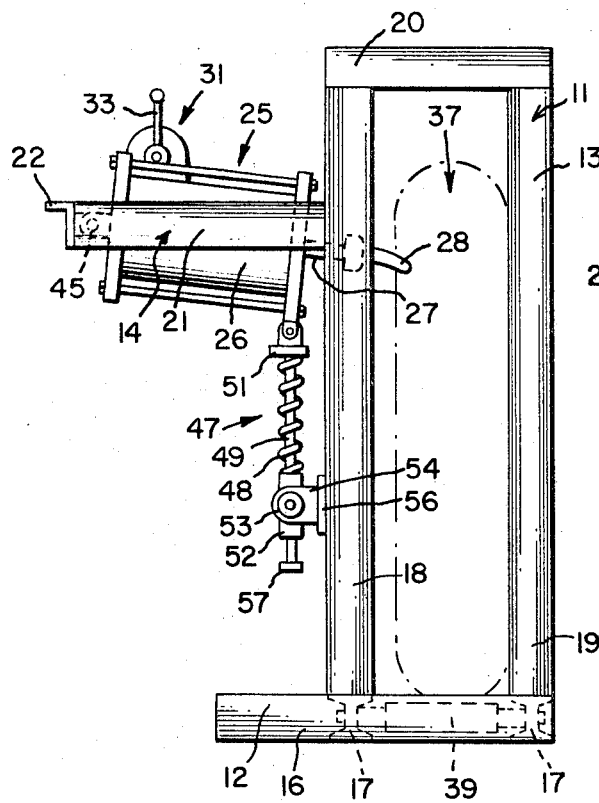
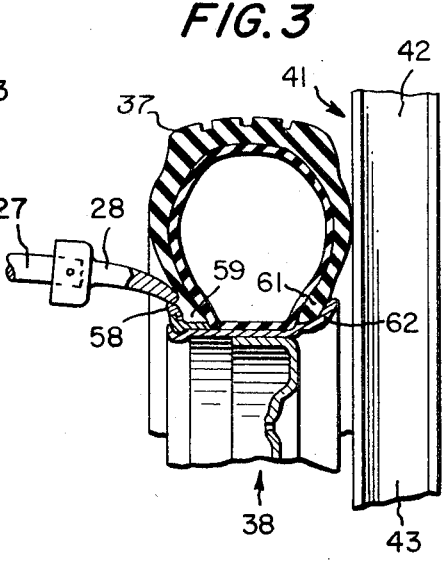
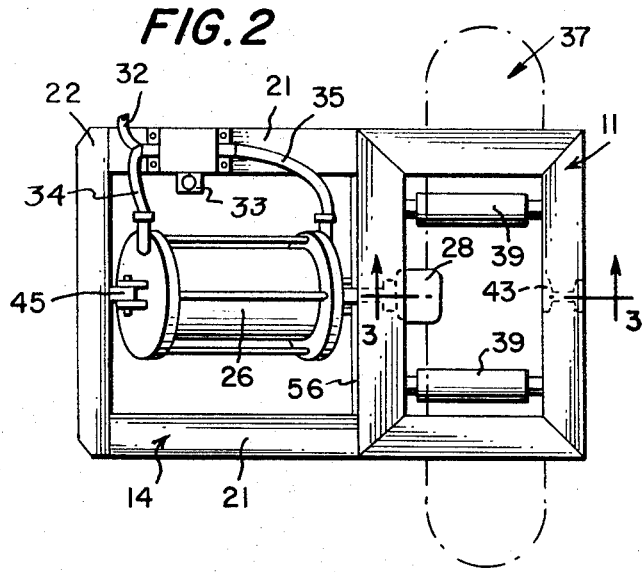
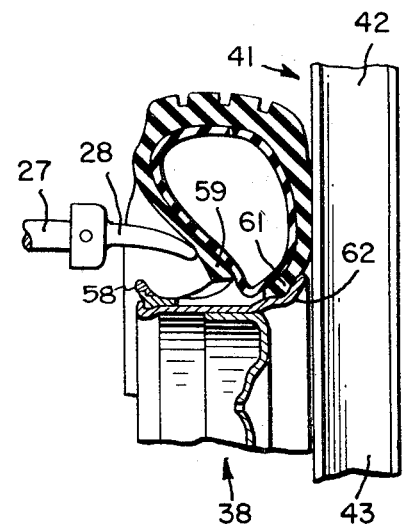
INVENTOR.
RALPH R. VOIGTS
BY
ATTORNEYS

TIRE BEAD BREAKER

BACKGROUND AND FIELD OF THE INVENTION

In the art of automotive tire change or repair, numerous means have been devised for separating or breaking the beads of a tire from the flanges of its supporting rim to facilitate subsequent removal of the tire from its rim.

PRIOR ART

Some of the typical prior art devices in this field are shown in United States Patents 2,832,400 and 3,051,224, issued to Allan R. Laughlin, and to Frank S. Pearne, respectively. In Laughlin the bead breaking member is an axially reciprocable ring which separates all portions of a tire bead simultaneously from a wheel rim; and Pearne shows a pair of opposing bead breaking members, one on each side of a tire, and movable simultaneously toward one another and against opposite tire walls to separate at least one tire bead from its rim. Equipment of this type, however, is necessarily relatively complex and expensive with increased power requirements, and accordingly is undesirable and uneconomic for an individual user, as on a farm or in smaller garages engaging in truck or tractor tire-changing.

SUMMARY OF THE INVENTION

A principal object of the instant invention is a minimizing of parts in a bead breaker by the provision of a single bead breaking member or spade, yieldably mounted for vertical oscillation from a normal substantially horizontal position adjacent one side of a tire and its rim, and in opposition to a buttress having a substantially flat, vertical face on the opposite side of the tire and rim assembly whereby the stationary buttress supports the tire and rim on one side while the spade is manually depressed, against its yieldable mounting, a distance dependent upon the tire size to align it with a portion of the tire adjacent the rim, and then moved horizontally into engagement with that tire portion to separate or break the tire bead from locking engagement with the rim.

Numerous other objects and advantages of the instant invention will become apparent as it is better understood from the following detailed description taken in connection with the accompanying drawings.

In the drawings:

FIG. 1 shows a side elevation of a bead breaker embodying a preferred form of the invention;

FIG. 2 shows a top plan view of the bead breaker;

FIG. 3 shows a section, in larger scale, taken at 3--3 in FIG. 2; and

FIG.4 is a section taken at 3--3 in FIG. 2 after the application of bead breaking pressure to the tire.

Referring to the drawings, FIGS. 1 and 2 show a main open frame 11 having a base 12 surmounted by a cage 13 from one side of which extends a U-shaped support or auxiliary frame 14. The frame is built of members which may be metal beams of suitable lengths and cross sections, united as by welding.

The base 12 comprises a pair of parallel side members 16 united by cross members 17. Members 16 include leg-like portions which project beneath support 14 to increase the effective base area. Inasmuch as the extended portions are beneath auxiliary frame 14, however, the same do not increase the required floor space or impede an operator. Four upright members as at 18, 19 of the cage 13 are united to and rise from the base 12 at substantially the points of intersection of the base members 16, 17; and a cage top 20 unites the upper ends of the members 19 and rear members 18 of the cage, thereby to provide a rigid and sturdy structure which is yet mechanically simple and permits maximum access thereto for tire handling.

The support 14 comprises a pair of side members 21 united at their forward ends to the cage rear members 18 and joined at their rear ends by a support rear member 22.

A ram, designated by the numeral 25, is yieldably or resiliently mounted in the auxiliary frame 14, in a manner to be more fully described hereinafter, and is fluid actuated in a conventional manner by pneumatic or hydraulic means. The ram 25 therefore comprises a housing or cylinder 26 within which a piston is reciprocated by the admission of fluid under pressure to the cylinder on one side of the piston while fluid is exhausted from the other end of the cylinder. Reversal of admission and exhaust results in reversal of the piston stroke. The piston carries with it a piston rod 27 having a bead breaking spade 28 secured to its forward end.

A pneumatic ram 25 is shown in the drawings wherein a valve 31 receives air under pressure through a conduit 32, from a source not shown, and by manipulation of a lever 33, directs the air through a rear conduit 34 or a forward conduit 35 to the ram, to advance or retract the spade 28.

The free end of the spade is thus operable toward and from a tire 37 mounted on a wheel rim 38 when the assembled tire and rim are placed in the cage 13 and on rollers 39 disposed in the base 12 and mounted for free rotation in base cross members 17. The forward side of the assembled tire and rim faces a substantially flat, vertical surface 41 of a buttress 42 which may be a portion of an intermediate upright member 43 secured at its lower end to the base 12 and at its upper end to the cage top 20 intermediate the uprights 19.

The rear portion of ram housing 26 is pivotally mounted at 45 to the rear member 22 of support 14 for vertical oscillation about the horizontal axis of the pivotal mounting 45, which axis is substantially normal to the axes of the ram and the assembled tire and rim in the cage.

The ram is also mounted at its forward end on a yieldable support 47 illustratively shown as a spring 48 surrounding a rod 49 and confined between a rod head 51 and an oscillatable trunnion 52. The rod head 51 is pivotally connected to the ram housing 26, and the trunnion 52 is journaled at 53 in a bearing 54 on a cross member 56 secured at its ends to the cage rear uprights 18. The spring 48 biases the support 47 to an upper position and a stop collar 57 on the lower end of the rod 49, which is slidably retained in the trunnion 52, is engageable with the trunnion to prevent the spring from raising the ram beyond a substantially horizontal position.

The above described yieldable mounting thus permits the ram to be lowered manually against the spring's pressure to direct the free end of the spade 28 to an upper side wall portion of the tire 37 adjacent a removable locking flange 58 of the rim 38. Then by manipulation of the valve 31 the spade is moved against the side wall of the tire (FIG. 3) to press it inwardly and thereby separate the tire bead 59 from the removable wheel flange 58 (FIG. 4). Preferably, this locking flange is removable from the rim 38 as is conventional with truck or industrial wheels, to thereby facilitate removal of the tire from the wheel. Successive circumferential portions of the bead may be broken from the flange by rotation of the tire on its roller support, and repetition of the bead breaking operation.

Thereafter the tire and rim are withdrawn from the cage and replaced in reverse position therein to break the other bead 61 from its flange 62, which latter is integral with the rim 38.

It is thought that the invention will be clearly understood from the foregoing description and that it is obvious that various changes may be made in the form, construction and arrangement of parts without departing from the spirit and scope of the invention.

I claim:

1. A tire bead-breaking device comprising:
   an open cage-like frame for loosely and rotatably retaining a wheel-mounted tire in substantially vertical position,
   said main frame including
   means on one side thereof providing rigid lateral support for said tire,
   ram means carried by said frame on the other side thereof, said ram means including a piston provided with a bead-breaking spade,
   means mounting said ram means for pivotal swinging movement in a vertical plane, said means including means yieldably restraining vertical movement thereof, said ram means constituting the sole means for clamping said tire within said cage frame against said rigid lateral support means during a bead-breaking operation, whereby upon retraction of said spade, the tire is immediately freed for rotative repositioning for a subsequent bead breaking operation, and means for operating and controlling said ram means to project and retract said spade.

2. A tire bead-breaking device comprising:

an open cage-like frame for receiving a wheel-mounted tire, ram means including a cylinder, and a piston therewith provided with a bead-breaking spade, means mounting said ram means on said frame for free pivotal swinging movement in a substantially vertical plane with said spade disposed adjacent a tire received within said frame, means yieldably and resiliently supporting said ram means thereby permitting continuously variable manual positioning of said ram in said vertical plane as required during a bead breaking operation, and means for operating said ram means.

3. The tire bead breaker of Claim 1, wherein said open frame comprises rectangular base and top frame portions connected by vertical corner standards to define a tire-receiving cage, said base frame portion including a pair of freely rotatable tire-supporting rollers mounted therein.

4. The tire bead breaker of Claim 3, wherein said rigid lateral support comprises a further vertical standard extending between and secured to said top and base frames intermediate two said corner standards.

5. The tire bead-breaker of Claim 1, wherein said ram means constitutes the sole movable means for substantially immobilizing a tire within said cage during a bead-breaking operation, whereby upon retraction of said spade, the tire is immediately freed for rotative repositioning for a subsequent bead-breaking operation.